June 23, 1970 — W. D. MACGEORGE ET AL — 3,516,289

PRESS INKOMETER

Filed Oct. 29, 1968 — 2 Sheets-Sheet 1

INVENTORS.
WILLIAM D. MACGEORGE
ROBERT J. BEAVERS
BY
B. T. Wolbensmith
ATTORNEY

INVENTORS.
WILLIAM D. MACGEORGE
ROBERT J. BEAVERS
ATTORNEY

United States Patent Office 3,516,289
Patented June 23, 1970

3,516,289
PRESS INKOMETER
William D. Macgeorge, Doylestown, and Robert J. Beavers, Plymouth Township, Montgomery County, Pa., assignors to Thwing-Albert Instrument Company, Philadelphia, Pa., a corporation of Pennsylvania
Filed Oct. 29, 1968, Ser. No. 771,563
Int. Cl. G01n *19/04, 33/32*
U.S. Cl. 73—150          8 Claims

ABSTRACT OF THE DISCLOSURE

A press inkometer having a sensing roll for engagement with an inked roll of a printing press to determine the tack or adhesion of the ink. The sensing roll is carried on a hinged mounting on a swivel plate in a housing. A motion transmitting arm movable with displacement of the roll about its hinge is connected to a signal source and dashpot. A zero adjustment is provided for the roll mounting. The housing is slidably mounted and adjustably resiliently urged to apply the desired force on the sensing roll and a stop is provided for presetting the force and permitting quick resetting after cleaning.

BACKGROUND OF THE INVENTION

Field of the invention

This invention relates to press inkometers for measuring the shear of ink on a selected roll of a printing press, so that adjustment can be made of the water supply to maintain the desired shear.

Description of the prior art

It has heretofore been proposed in the U.S. patent to Jorgensen, No. 3,191,528, to employ a strain gauge to measure the shear of ink and then through a suitable circuit control maintain the desired ink-water balance of the ink to print commercially acceptable work.

The inkometer therein disclosed had shortcomings including susceptibility of the strain gauge to vibrations, lack of reliability in the presence of moisture, difficulty of cleaning and maintaining in proper working condition.

The press inkometer of the present invention overcomes the shortcomings of press inkometers previously available as well as incorporating advantageous features not heretofore available.

Summary of the invention

In accordance with the invention a press inkometer is provided which includes a sensing roll carried in a housing which is movably mounted and resiliently urged for presetting the force at which the sensing roll is engaged with the ink film whose tack is to be measured. The sensing roll has a hinge support in one plane carried on a bearing in a frame, and with a signal providing element.

It is the principal object of the present invention to provide a press inkometer which is small and compact, which can be readily mounted in a wide variety of printing presses, which can be readily adjusted and which can be readily maintained in clean condition.

It is a further object of the present invention to provide a press inkometer which is not susceptible to the vibrations which occur in printing presses, which has the signal element sealed so that it is not subject to moisture and can be readily cleaned, which has a signal element of high output and of high sensitivity, which has a simple but effective zero adjustment, and which can have a predetermined force applied on the sensing roller forming part thereof.

It is a further object of the present invention to provide a press inkometer of the character aforesaid which is sturdy and reliable in its operation.

Other objects and advantageous features of the invention will be apparent from the description and claims.

Brief description of the drawings

The nature and characteristic features of the invention will be more readily understood from the following description taken in connection with the accompanying drawings forming part thereof, in which.

It should, of course, be understood that the description and drawings are illustrative merely and that various modifications and changes can be made in the structure disclosed without departing from the spirit of the invention.

Like numerals refer to like parts throughout the several views.

Description of the preferred embodiment

Figures 1, 2:
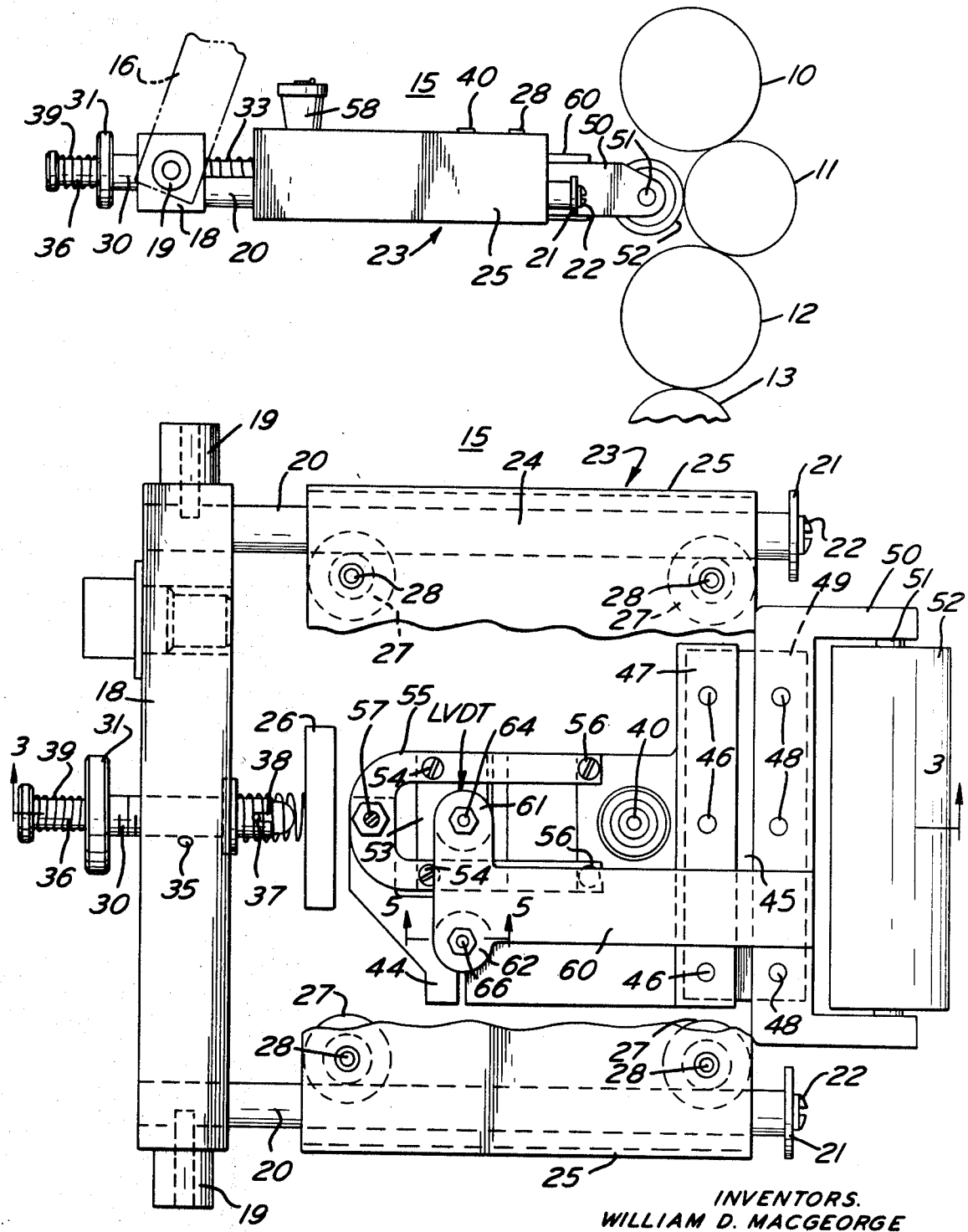
FIG. 1 is a side elevational view of a press inkometer in accordance with the invention showing the manner of mounting and use thereof.
FIG. 2 is a top plan view, enlarged, of the press inkometer shown in FIG. 1.

Referring now more particularly to the drawings, as shown in FIG. 1, a plurality of sequential ink transfer rolls 10, 11, 12 and 13 are illustrated merely for purposes of explanation with a press inkometer 15 associated therewith. The press inkometer 15 can be supported by a bracket 16 which is secured to a suitable frame rod (not shown) in the printing press and which is parallel to the roll 11.

The press inkometer 15 includes a support block 18 with end extensions 19 to which the mounting bracket 16 is secured. The support block 18 has spaced parallel guide bars 20 secured thereto with end stops 21 held in place by screws 22.

Figure 3:
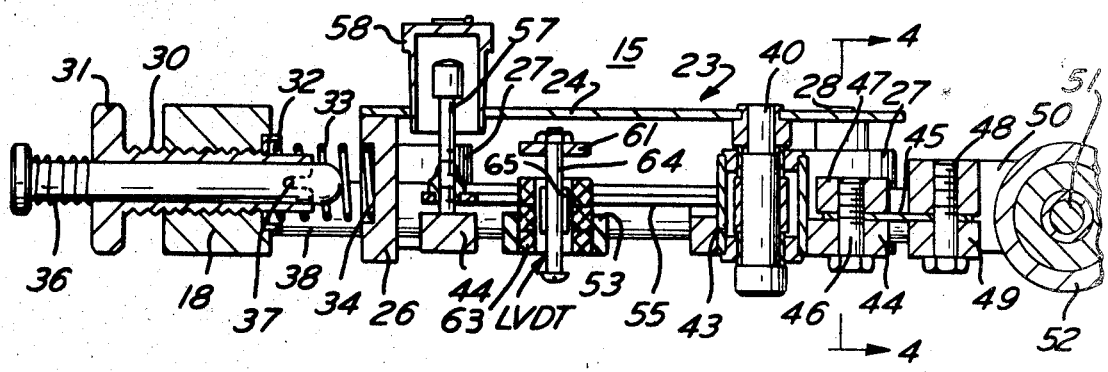
FIG. 3 is a longitudinal sectional view taken approximately on the line 3—3 of FIG. 2.
Figure 4:
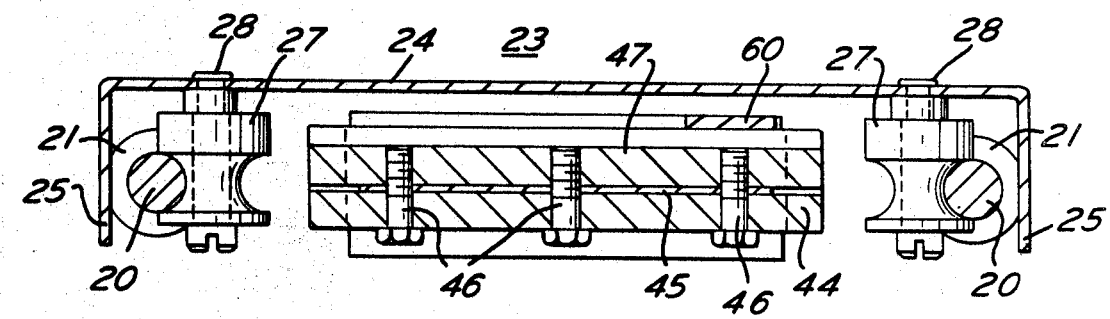
FIG. 4 is a transverse vertical sectional view taken approximately on the line 4—4 of FIG. 3.
Figure 5:
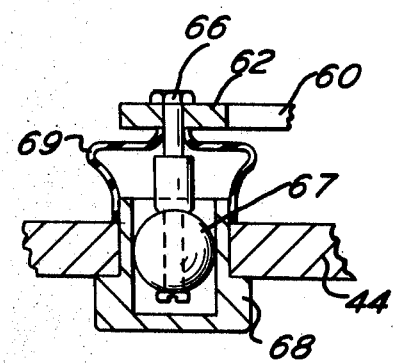
FIG. 5 is a fragmentary longitudinal sectional view, enlarged, taken approximately on the line 5—5 of FIG. 2.

A housing 23 having a top wall 24, opposite side walls 25 and a rear abutment 26 is slidably mounted on the guide bars 20 by guide rollers 27 carried on shafts 28 secured to the wall 24. A force adjusting or pressure screw 30 is provided in threaded engagement in the support block 18, has a manual operating knob 31 and carries a spring abutment 32 which is in engagement with one end of a compression spring 33. The other end of the spring 33 is in engagement in a socket 34 in the rear abutment 26. The spring 33 is of pre-determined spring rate to apply a predetermined load, as hereinafter pointed out. A tapered lock screw 35 can be provided for clamping the screw 30 in an adjusted position. A stop plunger 36 is slidably mounted in the screw 30, and has a transverse pin 37 carried thereby which can in one position engage the end of the screw 30 and in the other position, as shown in FIGS. 2 and 3, is seated in a longitudinal slot 38 in the screw 30. A spring 39 between the knob 31 and the head of the stop plunger 36 normally urges the stop plunger 36 toward the seated position of the transverse pin 37.

The stop plunger 36 in its position with the pin 37 on the end of the screw 30 and with its end engaging the rear abutment 26 provides a reference for setting of the spring 33 to give a desired force application.

The top wall 24 has a stub shaft 40 secured thereto which carries a supporting bushing 43 for pivotal mounting of a swivel plate 44.

A hinge plate 45 is provided, secured to the swivel plate 44 by bolts 46 which engage in a clamping plate 47. The hinge plate 45 also is secured by bolts 48 which engage a clamping plate 49 and in threaded openings to a roller carriage 50. The roller carriage 50 has journaled therein on a shaft 51, a sensing roller 52 which engages the ink film on the press roll 11.

A zero spring 55 held at one end by the screws 56 to the swivel plate 44 has a zero adjusting screw 57 in threaded engagement therewith and engages the swivel plate 44 at its free end. A cross plate 53 is provided and is secured to the spring 55 by screws 54. The adjusting screw 57 is protected against dirt and accidental change of adjustment by an inverted cup shaped cover 58 which is frictionally engaged in the top wall 24.

A motion transmitting arm 60 is provided secured to the roller carriage 50 and has transversely disposed end portions 61 and 62. The end portion 61 is located so as to be in a vertical central longitudinal plane extending through the zero adjusting screw 57 and intermediate the ends of and centrally of the roller 52.

The signal providing mechanism is at this location and in the present instance is preferably a linear variable differential transformer LVDT of well known type. The windings 63 are clamped in the cross plate 53 and the core 65 thereof carried by or incorporated in the rod 64 is moved with respect to the windings. The output terminals (not shown) can be connected to any suitable circuitry for utilization of the output signal or signals from the transformer LVDT.

The arm portion 62 preferably has a dash pot rod 66 carried thereby on which a ball 67 is mounted. The ball 67 is movable in a detachable cylinder 68 carried by the swivel plate 44. A dust cover 69 of material such as rubber can be employed to prevent the entry of dirt into the cylinder 68.

The mode of operation will now be pointed out.

The press inkometer 15 of the present invention, mounted at the desired location in a printing press and with its sensing roller 52 in engagement with a roller 11 of a printing press which can transfer ink, can initially be employed in a dry run of the press. This will permit of a coarse adjustment by the zero setting screw 57.

With the press in operating condition and with ink being transferred such as by roll 10 to roll 11 to roll 12 and to roll 13, and with the sensing roller 52 contacting the ink on the roll 11, the tack or adhesion of the ink can be measured.

The force with which the sensing roller 52 is urged toward the roll 11 is determined by the adjustment of the force adjustment screw 30 in engagement with the spring 33. The spring 33 is effective through the abutment 26, housing 23, stub shaft 40, bushing 43, swivel plate 44, hinge plate 45 and roller carriage 50 on the sensing roller 52.

The stop plunger 36 aids in determining the desired setting of the spring 33 and the lock screw 35 aids in retaining a selected adjustment.

The force applied in shear by the ink between a sensing roller 52 and the ink carrying roll 11 causes a pivotal movement, dependent upon the shear force, about the hinge provided by the hinge plate 45. This motion, transmitted by the arm 60 is effective at the transformer LVDT to provide a signal or signals dependent upon the connections of the windings of the transformer and the external circuitry. The dash pot 67, 68 provides a damping action.

It will thus be seen that simple but effective apparatus has been provided with which the objects of the invention are attained. The press inkometer 15 is compact and of relatively small size and especially the top to bottom dimensions thereof, with flexibility of mounting location and without regard to orientation, and with ease of adjustment.

We claim:
1. A press inkometer comprising
a sensing roller for ink contact,
a housing having a plate member therein,
mounting means connecting said plate member and said housing,
a hinged mounting connecting said sensing roller and said plate member,
a supporting block member,
mounting members between said supporting block member and said housing for relative linear movement thereof,
means for applying a force on said housing for urging said sensing roller into an ink contacting position,
a motion transmitting member actuated by said sensing roller, and
a signal supplying member controlled by the positioning of said motion transmitting member.

2. A press inkometer as defined in claim 1 in which
said force applying means comprises a resilient member interposed between said supporting block member and said housing.

3. A press inkometer as defined in claim 2 in which
an adjusting member is provided for said resilient member.

4. A press inkometer as defined in claim 3 in which
a stop member is provided carried by said supporting block member and engageable with said housing.

5. A press inkometer as defined in claim 1 in which
said sensing roller is mounted on a carriage,
said motion transmitting member includes an arm connected to said carriage, and
said signal supplying member is actuated by said arm.

6. A press inkometer as defined in claim 5 in which
a dash pot is provided and is connected to said arm.

7. A press inkometer as defined in claim 1 in which
zero setting means is provided for said roller which means engages said plate member.

8. A press inkometer as defined in claim 1 in which
said signal supplying means is a differential transformer having a portion carried by said housing and a portion connected to said roller for movement with said roller about said hinged mounting.

References Cited
UNITED STATES PATENTS 3,191,528    6/1965    Jorgensen    73—150 XR
3,368,399    2/1968    Wirz    73—150

LOUIS R. PRINCE, Primary Examiner

F. SHOON, Assistant Examiner